United States Patent Office 3,226,312
Patented Dec. 28, 1965

3,226,312
PROCESSES FOR THE MANUFACTURE OF NATURAL AND SYNTHETIC RUBBERS REINFORCED WITH FILLERS
Alphonse Lamm and Gusta Lamm, both of 10 Rue des Tournelles, Chatenay-Malabry, Seine, France
No Drawing. Filed Apr. 10, 1961, Ser. No. 101,682
Claims priority, application France, Apr. 26, 1960, 825,362
14 Claims. (Cl. 204—154)

This invention relates to processes for the manufacture of natural and synthetic rubbers which are reinforced with fillers.

It is known that the addition of fillers to rubbers imparts to articles manufactured from such rubbers novel useful properties, such as resistance to tension, to splitting, to abrasion, to repeated flexing, to light and to aging in general. Up to the present, it has only been possible by starting with dry rubber, obtained by coagulation of a latex and drying, to obtain the effect of reinforcement due to fillers by mixing the rubber and the filler addition in a roller or kneading mill, the addition of the ingredients necessary for vulcanization and other materials (plasticizers, lubricants, anti-aging agents, etc.) being made by means of the same mills simultaneously with and/or after the addition of the reinforcing filler.

The manufacture of an article in rubber thus requires several stages and proceeds generally by the formation of a more or less pasty mixture of rubber, a filler and various ingredients, by means of calendering machines, mixers, shearing drums, macerators, etc., before the operation of vulcanization, which can be effected by heating, with or without a mould, by compression, injection, transfer and so on.

This process is generally adopted in industry, but has numerous disadvantages and in particular consumes a considerable quantity of energy in a mechanical form. In fact, the rubber initially obtained from the coagulation of the latex has a high molecular weight, which means that if it is used as such, that is the say without mixing, it produces a vulcanized rubber having good mechanical properties. In the standard process in question, it is necessary to degrade the rubber by prolonged mastication before being able to work it in calenders and mixers. Mastication is often one of the most prolonged operations in the manufacture of a rubber mixture and, as with the other operations including milling, it consumes considerable amounts of mechanical energy.

The invention has the object of avoiding the disadvantages mentioned above of the standard process, while allowing the effect of reinforcement due to fillers to be obtained, not by starting with a dry rubber obtained by coagulation of latex and drying, but directly from the latex itself. In order to explain clearly the novelty of the invention, it would seem necessary to recall that the expression "latex" means an emulsion or aqueous suspension of elastomeric particles, that is to say, of polymers of isoprene, chlorobutadiene, butadiene and analogous compounds or copolymers of butadiene with styrene, acrylonitrile and analogous compounds.

The invention consists in subjecting the latex and/or the pulverulent reinforcing filler to irradiation, following which the latex is coagulated either chemically and/or thermally.

It has already been proposed to make use of $\alpha$, $\beta$, $\gamma$ or X-rays for various phases in the preparation of rubbers, but in such a way that it is known that these radiations had no effect on the latex, in which fillers were incorporated before drying.

For the irradiation of the latex and/or the filler according to the invention, any source emitting ionizing radiations is used, $\alpha$, $\beta$, $\gamma$ or X-rays for example, such as a nuclear reactor or natural or artificial radio-elements, located outside or inside the latex and/or the filler or a particle accelerating machine, such as a Van de Graaf machine or a linear accelerator or an X-ray apparatus.

It has been determined that the irradiation is advantageously continuous and that the irradiation dose is advantageously from $10^4$ to $10^8$ roentgens.

The filler is constituted in general by a carbon black of the type known as "reinforcing carbon block for rubber"; it can have a different nature and be constituted for example by a "clear" reinforcing charge, such as silica.

The filler can be put into suspension or aqueous dispersion before being added to the latex. If required, separate irradiation of the filler is made either in the pulverulent dry state or in the form of an aqueous suspension.

Irradiation of the latex, the aqueous filler dispersion or of the mixture of latex and the filler can be made in the "as-produced" state (that is to say, on products containing traces of oxygen), but in the absence of air or at least in the presence of a low volume of air or, better after elimination of all traces of oxygen (for example, by replacement with a gas inert to the elastomer, such as nitrogen, carbon dioxide or ammonia).

In all cases, after irradiation, the aqueous dispersion of the elastomer and filler is transformed into granules, pellicules, sheets, plates or articles of various shapes, by coagulation with the aid of electrolytes or by drying in air, under vacuum or in an atmosphere inert to the elastomer, at the ambient temperature or at an elevated temperature, in order to eliminate the water of the latex and/or of the aqueous suspension of the filler.

This drying can be followed by a heat treatment similar to vulcanization and intended to enhance the optimum mechanical properties and to give to the object its definitive form. This treatment by heating can itself be executed in air, in water, in live steam, under vacuum or in an inert atmosphere, in a mould or casting box, with or without pressure, and by filling the mould either manually or mechanically according to any known moulding technique in use, such as moulding by compression, transfer, injection and so on.

The composite dispersion obtained after irradiation or the coagulated and dried rubber derived from this dispersion can also be utilized for impregnating textile fabrics or yarns or for coating objects and articles containing textiles, previously impregnated with a more or less thick sheet or layer of filled elastomer. In this way, for example, a tread layer made from a dry mixture of elastomer and filler obtained according to the invention can be applied to a new or used pneumatic tire carcass, or a liquid layer of the composite dispersion containing the filler and the elastomer from the initial latex can be applied to a rubberized fabric belt, to manufacture a conveyor or transmission belt.

The invention will be described below in conjunction with the following non-limitative examples.

Examples 1–3

(a) *Conditions of irradiation and compositions common to these examples.*—Cobalt 60 is used as the source of $\gamma$ radiation. Any other source of ionizing radiation can be used, such as those mentioned above. The intensity of irradiation is of the order of $10^5$ roentgens per hour, but different intensities and, particularly, much higher intensities can be used with advantage. Irradiation of the latex and of the filler is effected in vessels of "Pyrex" glass, polyethylene or any other material compatible with these products.

The latex is a natural rubber latex, concentrated to 60% dry matter and stabilized with ammonia. It is irradiated without dilution or addition, except in the case of irradiation of the latex mixed with carbon black.

The filler is constituted by carbon black of the "high abrasion furnace black" type, for example that known as "Philblack O"; it is irradiated in the form of an aqueous dispersion, the dispersion having been prepared by mechanically grinding the following mixture for 48 hours in a ball mill:

| | Parts by weight |
|---|---|
| "Philblack O" carbon black | 100 |
| Distilled water | 600 |
| "Distabex LS" | 7.5 |
| 4% aqueous solution of gum tragacanth | 30 |

"Distabex LS" is a dispersion agent (alkali salt of a sulphonated formonaphthalene compound) and the gum tragacanth has the function of a thickener, preventing sedimentation of the carbon black.

The products and concentrations are given by way of example only and all other equivalent compositions known to those skilled in the art can be utilized.

The carbon black dispersion is added to the latex (after previous dilution thereof) either after or before irradiation, as explained in more detail below, but in the following proportions given by way of example:

| | Parts by weight |
|---|---|
| 60% latex | 100 |
| Distilled water | 67 |
| Carbon black dispersion | 100 |

This mixture corresponds approximately to the ratio:

| | Parts by weight |
|---|---|
| Rubber | 100 |
| "Philblack O" carbon black | 22.6 |

(b) *Example 1.*—One part of the latex and one part of the carbon black dispersion were separately irradiated and, additionally, a mixture of the latex and the carbon black dispersion (in the proportions indicated above), was irradiated with a dose of $1.3 \times 10^7$ roentgens.

The conditions of irradiation were as follows: irradiation in the "as-produced" state; ambient temperature; receptacles full and closed, namely, in the presence of a limited quantity of air in the receptacles; intensity of irradiation: 140,000 r./h.

After irradiation, one part of the irradiated carbon black dispersion was added to the irradiated latex (in the proportions indicated above) and the liquid was poured on to a glass plate (first pellicule). The other part of the irradiated product was poured out in the state of a mixture (second pellicule) and, finally, a mixture of non-irradiated latex and non-irradiated carbon black dispersion was made and poured out without irradiation of the mixture, by way of a first control sample, on to a sheet of glass (third pellicule). The three pellicules were dried in the air and had a thickness of about 1 mm. When they had dried, they were divided into two parts, one of which was subjected to traction tests and the other was heated for 2 hours at 100° C. in a stove, before being subjected to traction tests. In order to be able to compare them with latex vulcanized by sulphur, in the presence of carbon black without irradiation, a mixture having the following overall composition was prepared by mixing aqueous dispersions:

| | Parts by weight |
|---|---|
| Rubber | 100 |
| "Philblack O" carbon black | 22.6 |
| Zinc oxide | 3 |
| "Anti-oxidant MC" | 2.5 |
| Sulphur | 2.5 |
| "Accelerator 1105" | 1 |

"Anti-oxygen MC"=phenyl-β-naphthylamine.
"Accelerator 1105"=zinc phenylethyldithiocarbamate.

The liquid mixture corresponding to this composition was poured on to a sheet of glass, dried in air and heated for 60 minutes at 100° C. (second control sample).

The results obtained are as follows:

| | Without heating | | With heating | |
|---|---|---|---|---|
| | Resistance Rupture, kg./cm.$^2$ | Elongation Rupture, kg./cm.$^2$ | Resistance Rupture, kg./cm.$^2$ | Elongation Rupture, kg./cm.$^2$ |
| No irradiation (first control) | 70 | 650 | 65 | 650 |
| Separate irradiation (invention) | 176 | 750 | 208 | 850 |
| Irradiation of mixture (invention) | 132 | 650 | 123 | 700 |
| No irradiation (second control) | | | 170 | 770 |

These results show clearly, on the one hand, that irradiation has a "reinforcing" effect on mixtures of latex and carbon black, that irradiation can be effected on the mixture or separately and, also, that subsequent heating of the pellicules obtained by separate irradiation of the latex and carbon black even further improves the results which are then greater than those which are obtained by standard vulcanization.

(c) *Example 2.*—Under conditions similar to those of Example 1, the same substances were irradiated, that is to say, an aqueous dispersion of the filler and latex, but the optimum time for heating the pellicules at a temperature of 100° C. was carefully determined. Irradiated latex was then mixed with non-irradiated carbon black and non-irradiated latex mixed with irradiated carbon black; at the same time, similar control samples were prepared; the following table summarizes this series of experiments:

| Irradiation conditions | | Dose ×10$^7$ r. | Time of heating at 100° C. in minutes | Rupture load in kg./cm.$^2$ | Elongation at rupture, percent |
|---|---|---|---|---|---|
| Latex | Carbon black | | | | |
| No (First control) | No | 0 | 0 | 70 | 650 |
| Yes | Yes | 1.3 (Together) | 30 | 157 | 700 |
| Yes | Yes | 1.3 (Separately) | 45 | 236 | 830 |
| Yes | No | 1.3 | 30 | 203 | 800 |
| No | Yes | 1.3 | 0 | 105 | 750 |
| No (Second control) | No | 0 | 30 | 217 | 750 |

This series of tests confirms the preceding series and also shows that there is an optimum heating time after irradiation which appears to be the optimum vulcanization time by the standard process. It also shows that, while irradiation of the latex is essential, that of the carbon black alone, without having any considerable influence, nonetheless imparts some improvement. It will also be seen that, when favorable conditions are provided, the treatment by irradiation and heating gives values higher than those with standard vulcanization.

(d) *Example 3.*—Latex and the carbon black dispersion of the same composition as above were irradiated at a dose of $1.3 \times 10^7$ r., but after elimination of the oxygen occluded or dissolved in the latex and in the carbon black dispersion by displacement with gaseous ammonia for 30 minutes. The receptacles containing the two liquids were hermetically closed immediately after this treatment to prevent the entry of any air, the latex and carbon black only being mixed together after irradiation. After pouring out, drying in air and heating for 45 minutes at 100° C., the following values were obtained:

Rupture resistance, kg./cm.$^2$ _____ 300
Elongation at rupture, percent _____ 775

The figures clearly exceed any which can be obtained by irradiation in the presence of small quantities of air and also by the standard vulcanization with the aid of sulphur.

Example 4

Irradiation was carried out in a region located 50 cm. from the core of a swimming pool reactor which, because of the lowness of the number of thermal neutrons in this type of reactor and through opposition to irradiations in nuclear reactors of different types, allows maximum diminution of the radioactivity induced in the irradiated products.

The reactor power was 2 mw.; the intensity of irradiation was $4.10^6$ r./h.; the irradiation lasted for 3 hours 15 minutes; the irradiation dose was $1.3 \times 10^7$ r.

The dispersion of carbon black and the latex (of natural rubber) were irradiated separately in polyethylene receptacles clad with cadmium to absorb thermal neutrons and to prevent activation of metallic impurities in the latex and in the filler.

Pellicules of coagulated and dried reinforced rubber were prepared and then subjected to the traction test; the results were as follows:

Rupture resistance, kg./cm.$^2$ _____ 240
Elongation at rupture, percent _____ 820

Example 5

Irradiation was effected in a linear electron accelerator having an energy of 4 mev.; the intensity of irradiation was $1.8 \times 10^8$ r./h., the time of irradiation was 4 minutes 20 seconds and the irradiation dose was $1.3 \times 10^7$ r.; the carbon black and the latex were irradiated separately, the carbon black being irradiated in the pulverulent state.

Pellicules prepared as described previously gave the following results in the traction tests:

Rupture resistance, kg./cm.$^2$ _____ 250
Elongation at rupture, percent _____ 800

Example 6

Irradiation was effected by means of X-rays, the spectrum of which had an energy maximum equal to 150 kv. (150 kilovolts crest value), the intensity of irradiation being $1.2 \times 10^6$ r./h, the duration of irradiation being 10 hours and the dose of irradiation being $1.2 \times 10^7$ r.

Under the same conditions as in Example 1, with separate irradiations, traction tests gave the following results:

Rupture resistance, kg./cm.$^2$ _____ 235
Elongation at rupture, percent _____ 810

Example 7

A synthetic S.B.R. latex was utilized, constituted by an aqueous dispersion of a 23% styrene butadiene-styrene copolymer; the latex contained 25% by weight of elastomeric particles; irradiation of the carbon black and the latex was effected separately, the other conditions being those of Example 1 (particularly γ irradiation by means of cobalt 60).

Coagulated and dried reinforced rubber pellicules gave the following traction test results:

Rupture resistance, kg./cm.$^2$ _____ 150
Elongation at rupture, percent _____ 600

Example 8

The filler was a "clear" reinforcing filler, constituted by silica, dispersed under the same conditions as the carbon black; the dispersion of the filler and the latex (natural rubber) were irradiated separately; the pellicules prepared contained 15% by weight of the filler; traction test results were as follows:

Rupture resistance, kg./cm.$^2$ _____ 210
Elongation at rupture, percent _____ 750

The process according to the invention allows enhanced mechanical resistances to be obtained, due to irradiation, by direct employment of latex in admixture with reinforcing fillers of the carbon black type.

Also, irradiation of the latex followed by simple heating replaces vulcanization by agents such as sulphur, zinc oxide and accelerators, with an irradiation dose which is much lower than that which is generally necessary to vulcanize dry rubber in admixture with carbon black. In fact, to obtain a suitable vulcanization of dry rubber by radiations, doses of $4 \times 10^7$ r. are necessary under such conditions. The use of certain sensitizers allows analogous results to be obtained for a lower irradiation dose, of the order of $2 \times 10^7$ r. But the present process allows a well vulcanized rubber to be obtained, without any addition of a chemical product, with an irradiation dose of the order of $10^7$ r., for example, and a quite limited heating which develops the optimum properties of the mixture.

The process according to the invention thus allows the difficult mixing of the rubber to be dispensed with and various advantages to be obtained in rubber vulcanized by radiation, such as the absence of sulphur or mercaptans, with a dose 4 times less than that which is necessary by simple radiation of dry mixtures. The fact of working in liquid media also has other advantages, for example the possibility of rendering the irradiation process continuous, by circulating the latex or the carbon black dispersion in an irradiator, such as a nuclear reactor, and of avoiding irradiation of moulds which absorb radiation and unnecessarily occupy valuable space.

Also, the use in the latex of the sensitizers mentioned above allows the irradiation dose to be decreased still further, where a supplementary saving is obtained which adds to the afore-mentioned advantages.

By choosing chloroform as the sensitizer, the process can be carried out as follows, for example:

(a) Preparation of a solution of the following composition:

Cc.
$CHCl_3$ _____ 1
$C_2H_5OH$ _____ 5
$H_2O$ (distilled) _____ 4

(b) Addition of this solution to latex:

10 cc. of solution
100 cc. of natural rubber latex (c) Irradiation of the latex (with $CHCl_3$). Irradiation of the carbon black dispersion (without $CHCl_3$) at different irradiation doses.

(d) Preparation of pellicules (containing 22.5% of carbon black) under conditions similar to those of the foregoing examples.

Traction tests then give the following results:

| Irradiation dose $\times 10^6$ r. | Rupture resistance in kg./cm.² | Elongation at rupture, percent | Hardness (by microhardness tester) |
|---|---|---|---|
| 1.39 | 185 | 760 | 56 |
| 2.72 | 192 | 725 | 63 |
| 5.85 | 161 | 500 | 67 |
| 8.65 | 136 | 475 | 74 |
| 12.60 | 84 | 350 | |

It will be seen that the optimum irradiation dose is between $1.39 \times 10^6$ and $2.72 \times 10^6$ r. (in place of $1.3 \times 10^7$ r.). Thus, approximately a factor of 10 is gained by the use of a sensitizer.

The proportion of sensitizer also has an optimum value for each irradiation dose, as shown by the following tests effected for an irradiation dose of $1.4 \times 10^6$ r.

| Concentration of $CHCl_3$ by volume, percent | Rupture resistance in kg./cm.² | Elongation at rupture, percent | Hardness (by microhardness tester) |
|---|---|---|---|
| 0.1 | 158 | 475 | 55 |
| 0.5 | 221 | 510 | 60 |
| 1 | 192 | 725 | 63 |
| 2 | 190 | 385 | 69 |

The proportion of carbon black in the coagulated and dried reinforced rubber pellicules was 22.5% by weight; the other conditions were the same as in Example 1.

Thus the optimum mechanical properties of the pellicules for this irradiation dose are between 0.5 and 1% by volume of chloroform.

What we claim is:

1. A process for manufacturing rubber from constituents comprising a latex selected from the group consisting of natural and synthetic rubbers and at least one filler selected from the group consisting of carbon black and silica, said process comprising subjecting at least one of said consistuents to high energy ionizing radiation, mixing said constituents into a composite mixture and subsequently drying said mixture to thereby obtain a solid rubber product.

2. A process as claimed in claim 1 wherein both said latex and said filler are subjected to said ionizing radiation.

3. A process as claimed in claim 1 wherein the sensitivity of said latex to said radiation is increased by adding chloroform to said latex and then subjecting said chloroform containing latex to said ionizing radiation.

4. A process for manufacturing rubber from constituents comprising a latex selected from the group consisting of natural and synthetic rubbers and at least one filler selected from the group consisting of carbon black and silica, said process comprising subjecting said latex to high energy ionizing radiation, mixing said latex with an aqueous dispersion of said filler and drying the resulting mixture to form a solid rubber product.

5. A process for manufacturing rubber from constituents comprising a latex selected from the group consisting of natural and synthetic rubbers and at least one filler selected from the group consisting of carbon black and silica comprising mixing said latex and said filler, subjecting the resulting mixture to high energy ionizing radiation and drying the irradiated mixture to form a solid rubber product.

6. A process according to claim 1, in which the dried rubber is applied to a support comprising textile yarns impregnated with an elastomer.

7. A process according to claim 1, in which the composite mixture is applied to a support constituted by textile yarns impregnated with an elastomer and the mixture is then coagulated and dried.

8. A process according to claim 1, in which irradiation is effected in a continuous manner.

9. A process according to claim 1, in which the irradiation dose is between $10^4$ and $10^8$ roentgens.

10. A process according to claim 1, in which irradiation is effected in the absence of air on substances containing traces of oxygen.

11. A process according to claim 1, in which irradiation is effected on substances containing traces of oxygen in the presence of a residual volume of air which is low with respect to the volume of the substances.

12. A process according to claim 1, in which irradiation is effected in an inert atmosphere on substances from which traces of oxygen have previously been eliminated.

13. A process according to claim 1, in which the composite mixture is coagulated, dried and is then subjected to heat treatment.

14. A process according to claim 13, in which moulding is effected during the heat treatment.

References Cited by the Examiner

UNITED STATES PATENTS

| | | | |
|---|---|---|---|
| 2,656,324 | 10/1953 | Te Grothenhuis | 260—763 |
| 2,665,222 | 1/1954 | Boinet et al. | 117—162 |
| 2,787,266 | 4/1957 | Scholl | 117—163 |
| 2,973,309 | 2/1961 | Brodkey et al. | 204—160 |
| 3,004,940 | 10/1961 | King | 260—763 |
| 3,084,115 | 4/1963 | Smith et al. | 204—154 |
| 3,093,561 | 6/1963 | Kraus | 204—154 |
| 3,130,139 | 4/1964 | Harper et al. | 204—154 |

FOREIGN PATENTS 831,197   3/1960   Great Britain.

OTHER REFERENCES

Schulte et al., Journal of the American Chemical Society, May 5, 1953, volume 75 (pp. 2222–2227).

MURRAY TILLMAN, *Primary Examiner.*

LEON J. BERCOVITZ, SAMUEL H. BLECH,
*Examiners.*

K. B. CLARKE, W. L. BASCOMB, *Assistant Examiners.*